US006642670B2

(12) United States Patent
Zhang et al.

(10) Patent No.: US 6,642,670 B2
(45) Date of Patent: Nov. 4, 2003

(54) BALLAST CONVERTER WITH POWER FACTOR AND CURRENT CREST FACTOR CORRECTION

(75) Inventors: Jinfa Zhang, Taoyuan Hsien (TW); Chenyang Liu, Taoyuan Hsien (TW); Fu-Yuan Hsu, Taipei (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/081,954

(22) Filed: Feb. 22, 2002

(65) Prior Publication Data

US 2003/0071582 A1 Apr. 17, 2003

(30) Foreign Application Priority Data

Oct. 12, 2001 (TW) ....................................... 90125324 A

(51) Int. Cl.[7] ........................... H05B 41/16; H02M 1/12

(52) U.S. Cl. ....................... 315/247; 315/246; 315/291; 315/224; 315/DIG. 7; 363/44; 363/37

(58) Field of Search ................................. 315/247, 246, 315/291, 307, 224, 209 R, 200 R, 219, DIG. 7; 363/44, 37

(56) References Cited

U.S. PATENT DOCUMENTS 5,258,692 A * 11/1993 Jones ......................... 315/247
5,488,269 A * 1/1996 El-Hamamsy et al. ...... 315/307
5,517,086 A * 5/1996 El-Hamamsy et al. ...... 315/247
5,986,901 A * 11/1999 Weng ........................... 363/44
5,994,847 A * 11/1999 Konopka ................ 315/209 R

* cited by examiner

*Primary Examiner*—Hoang Nguyen
*Assistant Examiner*—Tuyet T. Vo
(74) *Attorney, Agent, or Firm*—Kirton & McConkie; Michael F. Krieger

(57) ABSTRACT

A ballast converter with a power factor and crest factor correction to be connected to an input source for providing an input voltage. The ballast converter includes a rectifier, a power converter, and a valley fill circuit, wherein the power converter recharges the valley fill circuit for energy storage storing energy while the value of the first voltage is larger than a predetermined value, the valley fill circuit provides the first voltage with a supplementary energy while the value of the first voltage is lower than the predetermined value, and the predetermined value is adjustable by the valley fill converter circuit.

19 Claims, 9 Drawing Sheets

BALLAST CONVERTER WITH POWER FACTOR AND CURRENT CREST FACTOR CORRECTION

FIELD OF THE INVENTION

The present invention relates to a modified ballast converter, and more particularly to a ballast converter with a power factor and current crest factor correction.

BACKGROUND OF THE INVENTION

Referring to FIGS. 1(*a*) and (*b*), a typical ballast converter is used to initialize a gas discharge lamp 4, wherein the ballast converter comprises a electrical utility power line 1, a rectifier 2, and a high frequency power converter 3. The high frequency power converter 3 further comprises a switching circuit 31 and a resonance circuit 32, wherein the resonance circuit 32 is coupled between the gas discharging lamp 4 and the ballast converter.

The most important purpose for designing the ballast converter is to approach optimum power quality, such as the power factor (PF), the total harmonic distortion (THD), and the current crest factor (CCF). According to the prior art, there are many different modified methods to make a ballast converter approach optimum power quality. As examples, FIG. 1(*a*) depicts a valley fill ballast converter with spike reducing and FIG. 1(*b*) depicts a valley fill ballast converter with a high frequency current feedback. However, when the valley fill ballast converter with a high frequency current feedback is operated at an 220 volt input voltage, the 30~70 kHz switch frequency and the output power of 80 watts, wherein the PF, THD and CCF are at the values of 0.95, 31%, and 2.1 respectively. On the other hand, when the valley fill ballast converter with the high frequency current feedback is operated at an 120 volt input voltage, the 30 kHz switch frequency and the output power of 64 watts, wherein the PF, THD and CCF are at the values of 0.93, 36%, and 1.7 respectively. Accordingly, a ballast converter of the prior art has to add a lot of devices to improve the electric effect and that must increase the complexity of the circuit, the energy loss of all devices, and the cost of the ballast converter.

Hence, the present invention improves the prior art and provides a ballast converter with a power factor and current crest factor correction.

SUMMARY OF THE INVENTION

It is one object of the present invention to provide a ballast converter with power factor and current crest factor correction for improving the electrical power quality.

It is another object of the present invention to provide a ballast converter with a power factor and current crest factor correction for reducing the complexity of the circuit, the energy loss of all devices, and the cost of the ballast converter.

According to the present invention, A ballast circuit with a power factor and crest factor correction electrically connected to an power source for providing an input voltage comprises: a rectifier electrically connected to the power source for rectifying the input voltage so as to provide a first voltage at a pair of DC supply terminals; a power converter electrically connected to the rectifier for converting the first voltage into a highfrequency output voltage so as to provide a load with an electrical energy; and a valley fill circuit electrically connected with an output end of the power converter and the DC supply terminals, wherein the power converter charges the valley fill circuit for storing energy while the value of the first voltage is larger than a predetermined value, the valley fill circuit provides the first voltage with a supplementary energy while the value of the first voltage is lower than the predetermined value, and the predetermined value is adjustable by the valley fill converter circuit.

Certainly, the power converter can be an inverter.

Certainly, the first voltage can be a DC voltage.

Preferably, the valley fill circuit further comprises: a first inductor having one end electrically connected with the output end of the power converter; a first diode having a anode end electrically connected with the other end of the first inductor; a first energy-storing capacitor having one end electrically connected with a cathode end of the first diode and the other end electrically connected with the ground; and a second diode having a anode end electrically connected with the cathode end of the first diode and a cathode end electrically connected with one of the DC supply terminals.

Preferably, the ballast converter further comprises a self-excited transformer, wherein one end of a primary winding is electrically connected with the output end of the power converter and the other end of the primary winding is electrically connected with the load for detecting a current of an output end of the power convert.

Preferably, the power convert further comprises: a first transistor electrically connected with one of the DC supply terminals; a second transistor electrically connected with the first transistor, wherein a connecting point of the two transistors is an output end of the power convert; a first resistor having one end electrically connected with a base terminal of the first transistor, and the other end electrically connected with a first secondary winding of the self-excited transformer; a second resistor having one end electrically connected with a base terminal of the second transistor and the other end electrically connected a second secondary winding of the self-excited transformer; a first regulation diode set electrically connected in parallel with the first secondary winding of the self-excited transformer, wherein a second voltage turns on the first transistor while the first secondary winding sends a feedback current to the primary winding to obtain the second voltage across the first regulation diode set; and a second regulation diode set electrically connected in parallel with the second secondary winding of the self-excited transformer, wherein a third voltage turns on the second transistor while the second secondary winding sends a feedback current to the primary winding to obtain the third voltage across the second regulation diode set, and the second secondary winding and the first secondary winding are of reverse polarity.

Preferably, the power convert further comprises a start circuit comprising: a third resistor electrically connected to one of the DC supply terminals; a first capacitor having one end electrically connected with the other end of the third resistor and the other end grounded; a third diode having a anode end electrically connected with a connecting point of the third resistor and the first capacitor and a cathode end electrically connected with the output end of the power converter; and a bilateral trigger diode electrically connected with the anode end of the third diode and a connecting point of the second regulation diode set and the second resistor.

Certainly, the load can be a discharge lamp.

Preferably, the ballast converter further comprising a resonance circuit electrically connected with the load, wherein the resonance circuit comprises at least one inductor and at least one capacitor for providing a desired current to the load.

Preferably, the resonance circuit further comprises: a second capacitor electrically connected in series with the load; and a second inductor having one end electrically connected in parallel with the load and the other end electrically connected with the other end of the primary winding.

Preferably, the ballast converter further comprises a wave-filter inductor, the wave-filter inductor having one end electrically connected with the input voltage and the other end electrically connected with the rectifier for filtering the input voltage.

Preferably, the ballast converter further comprises a set of charge pump capacitors, the charge pump capacitors electrically connected with a high-frequency end of the load and two ends of the power source for providing a high-frequency current circuit between the load and the input voltage, thereby modifying the valley-current waves of the input voltage to improve the power factor of the ballast converter.

Preferably, the ballast converter further comprises a second energy-storing capacitor electrically connected with the high-frequency end of the load for charging the energy-storing capacitor.

Preferably, the charge pump capacitor comprises a first charge pump capacitor and a second charge pump capacitor, wherein the first charge pump capacitor is electrically connected in series with the second charge pump capacitor, and a connecting point of the set of charge pump capacitors is electrically connected with the high-frequency end of the load for providing a high-frequency current circuit between the load and the input voltage.

Now the foregoing and other features and advantages of the present invention will be more clearly understood through the following descriptions with reference to the drawings, wherein:

DETAILED DESCRIPTION OF THE PREFERRED EMBODIMENT

Figure 1A:
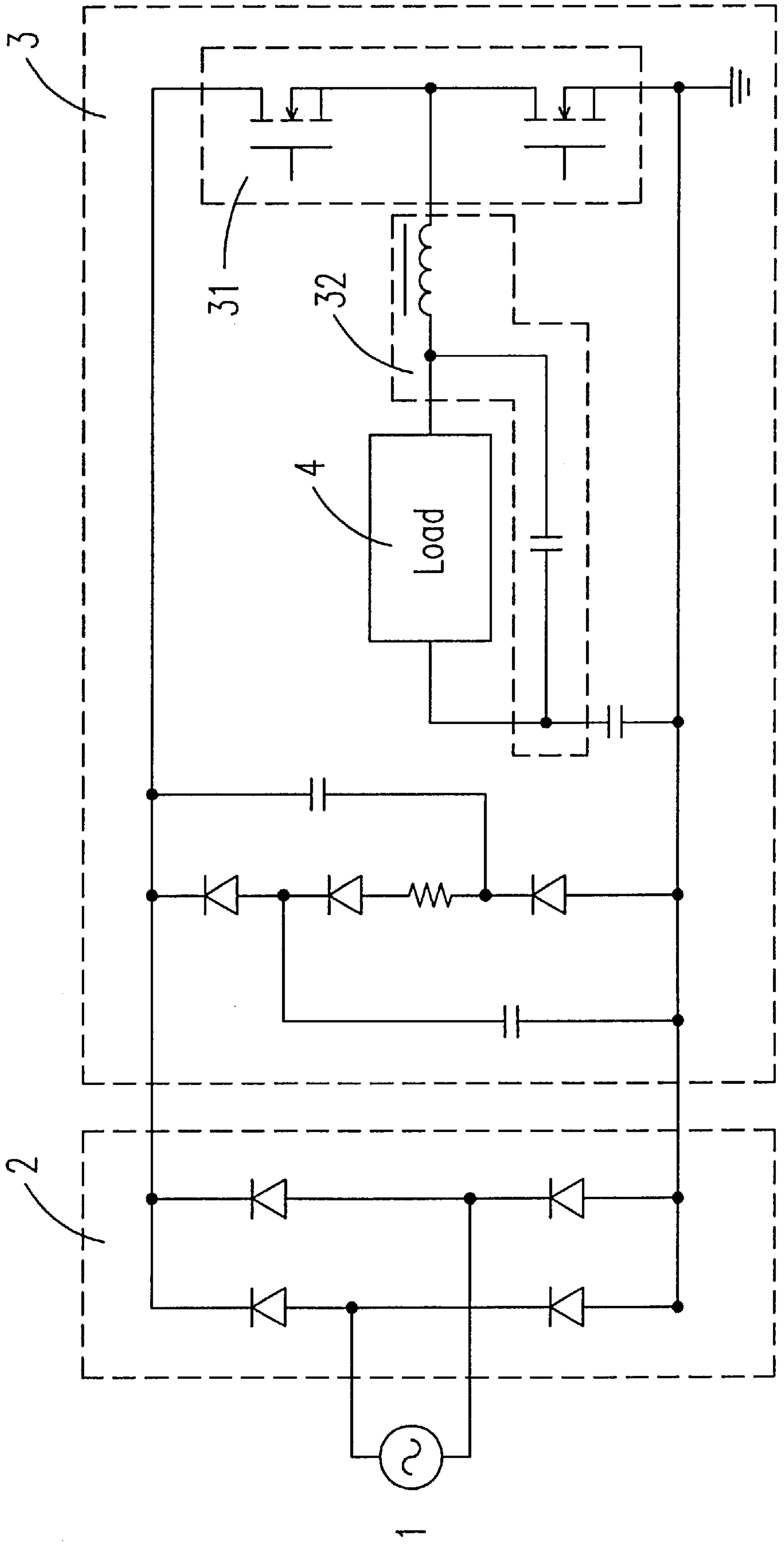
Fig. 1(a)(PRIOR ART)
FIGS. 1(*a*) and 1(*b*) schematically depict a valley fill ballast converter with spike reducing and high frequency current feedback respectively.
Figure 1B:
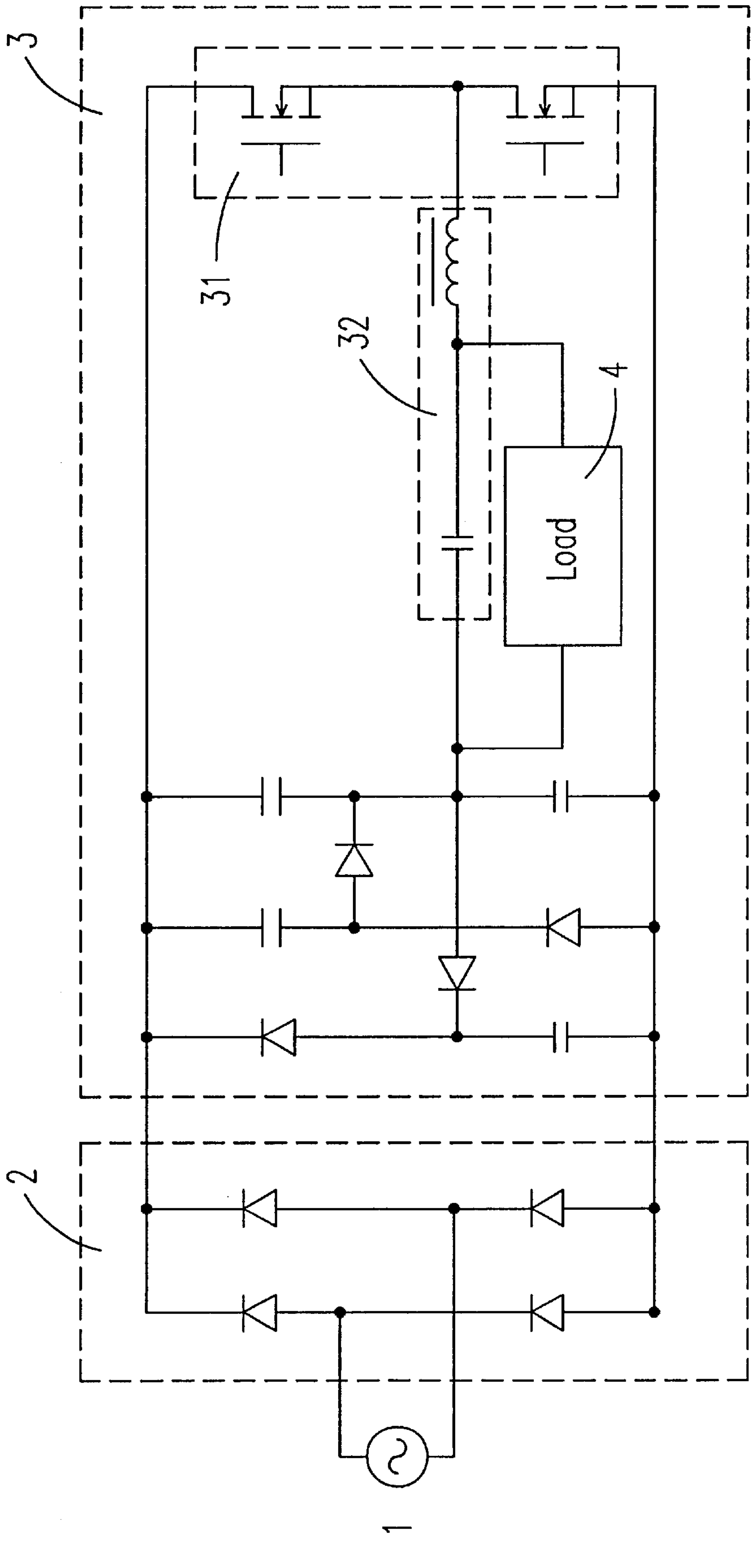
Fig. 1(b)(PRIOR ART)
Figure 2:
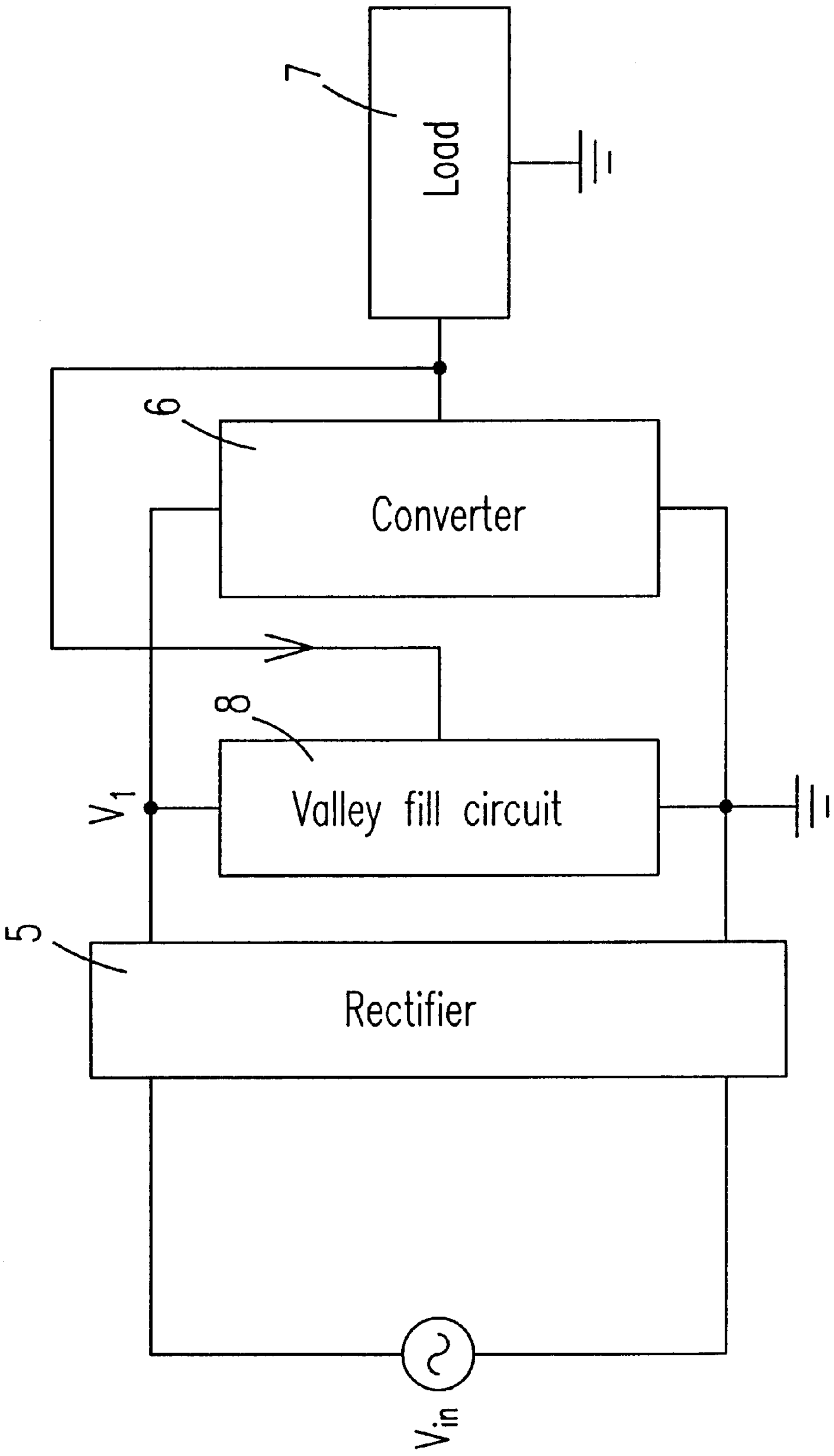
FIG. 2 illustrates a circuit block chart of a preferred embodiment of a ballast converter with a power factor and current crest factor correction.

Referring to FIG. 2, a circuit block diagram of a preferred embodiment of a ballast converter with a power factor and current crest factor correction is shown. As shown in FIG. 2, the ballast converter with a power factor and current crest factor correction connects to an power source providing an input voltage Vin, wherein the ballast converter comprises a rectifier 5, a power converter 6 and a valley fill circuit 8. The rectifier is electrically connected to the input voltage Vin for rectifying the input voltage Vin so as to provide a first voltage V1 at a pair of DC supply terminals. The power converter 6 electrically connects to the rectifier 5 for converting the first voltage V1 into an output by a high frequency output voltage so as to provide a load 7 with an electrical energy. The valley fill circuit 8 is electrically connected with an output end of the power converter 6 and the DC supply. Wherein, the power converter 6 charges the valley fill circuit 8 for storing energy while the value of the first voltage is larger than a predetermined value. Alternatively, the valley fill circuit 8 provides the first voltage V1 with a supplementary energy while the value of the first voltage is lower than the predetermined value. The predetermined value is adjustable by the valley fill circuit 8.

Figure 3:
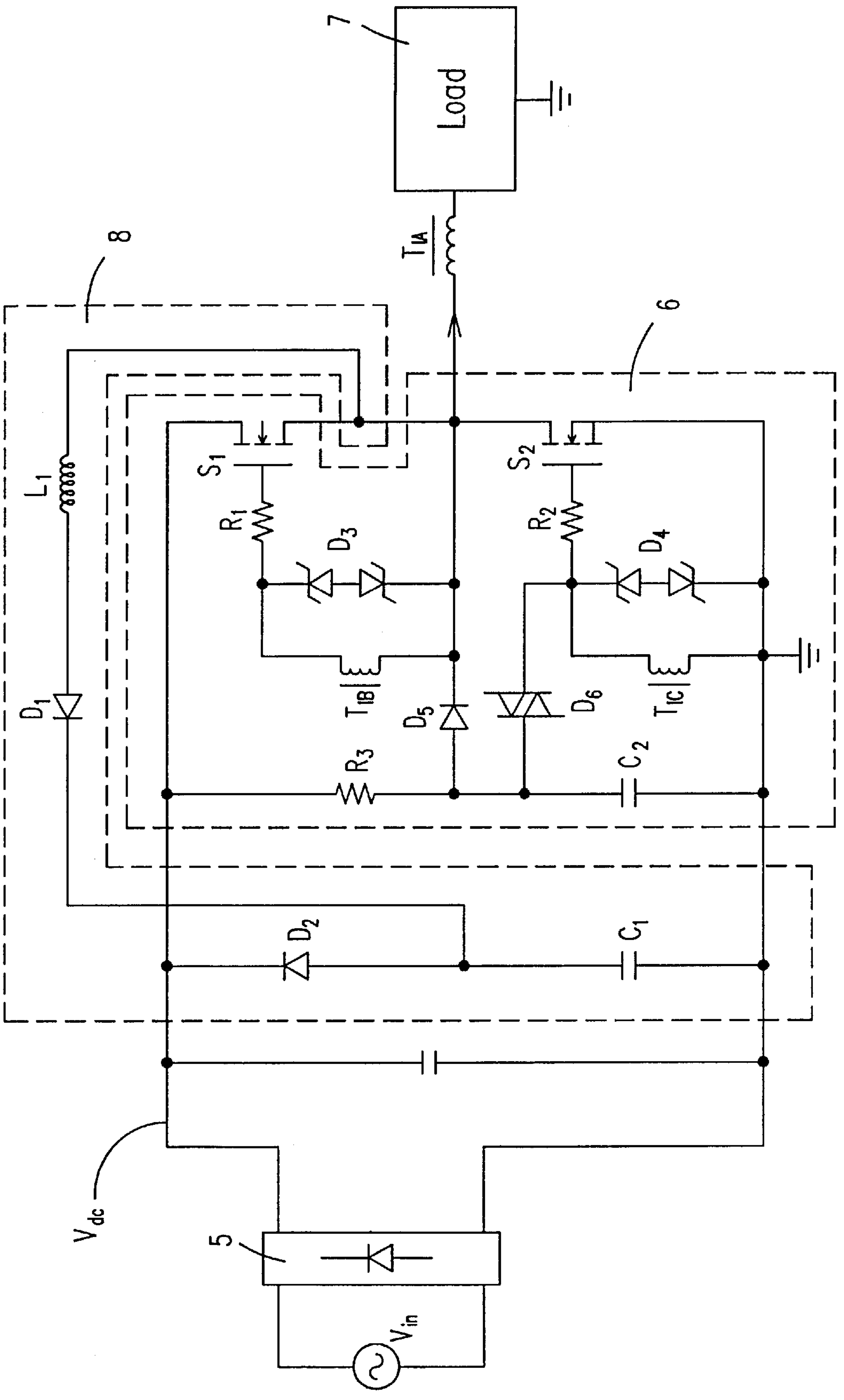
FIG. 3 illustrates a first preferred embodiment of a ballast converter with a power factor and current crest factor correction.

Referring to FIG. 3, it illustrates another preferred embodiment of a ballast converter with a power factor and current crest factor correction. As shown in FIG. 3, the ballast converter with a power factor and current crest factor correction connects to an input source providing an input voltage Vin, wherein the ballast converter comprises a rectifier 5, a power converter 6 and a valley fill circuit 8. The power converter 6 is an inverter. The rectifier electrically connects to the power source for rectifying the input voltage Vin so as to provide a first voltage at a pair of DC supply terminals Vdc. The power converter 6 electrically connects to the rectifier 5 for converting the first voltage Vdc into a high frequency output voltage so as to provide a load 7 with an electrical energy. The valley fill circuit 8 is electrically connected with an output end of the power converter 6 and the DC supply terminals. Wherein, the power converter 6 charges the valley fill circuit 8 for storing energy while the value of the first voltage Vdc is larger than a predetermined value. Alternatively, the valley fill circuit 8 provides the first voltage Vdc with a supplementary energy while the value of the DC voltage is lower than the predetermined value. The predetermined value is adjustable by the valley fill circuit 8.

The valley fill circuit 8 further includes a first inductance L1, a first diode D1, a first energy-storing capacitor C1 and a second diode D2. Wherein, one end of the first inductance L1 connects with the output end of the power converter 6. The anode end of the first diode D1 is electrically connected with the other end of the first inductance L1. One end of the first energy-storing capacitor C1 electrically connects with the cathode end of the first diode and the other end of the first energy-storing capacitor C1 connects with the ground. Moreover, the anode end of the second diode D2 is connected with the cathode end of the first diode D1 and the cathode end of the second diode D2 is electrically connected with the DC supply terminals Vdc.

The ballast converter further includes a self-excited transformer (T1A, T1B, and T1C), wherein one end of the primary winding T1A electrically connects with the output end of power converter 6 and the other end of the primary winding electrically connects with the load 7 for detecting a current of an output end of the power converter 6. Moreover, the power converter 6 includes a first transistor S1, a second transistor S2, a first resistor, a second resistor, a first regulation diode set D3 and a second regulation diode set D4. Wherein, one end of the second resistor electrically connects with a base terminal of the second transistor S2 and the other end of the second resistor electrically connects with the second secondary winding T1C of the self-excited transformer. The first regulation diode set D3 and the first secondary winding T1B of the self-excited transformer are electrically connected in parallel. Wherein, a second voltage turns on the first transistor S1 while the first secondary winding T1B sends a feedback current to the primary winding T1A to obtain the second voltage across the first regulation diode set D3. Additionally, the second regulation diode set D4 and the second secondary winding T1C of the self-excited transformer are electrically connected in parallel. Wherein, a third voltage turns on the second transistor S2 while the second secondary winding T1C sends a feedback current to the primary T1A to obtain the third voltage across the second regulation diode set D4 and the second secondary winding T1C and the first secondary winding T1B are of reverse polarity. Hence, when the first transistor S1 is on, the second transistor S2 is off. Contrariwise, when the first transistor S1 is off, the second transistor S2 is on. The power converter 6 further comprises a start circuit, wherein the start circuit comprises a third resistor R3, a first capacitor C2, a third diode D5 and a bilateral trigger diode D6. One end of the third resistor R3 electrically connects to one of the DC supply terminals, the other end of the third resistor R3 electrically connects with one end of the first capacitor C2, and the other end of the first capacitor C2 connects to the ground. The anode end of the third diode D5 connects with a connecting point of the third resistor R3 and the first capacitor C2. The cathode end of the third diode D5 connects with the power convert 6. Moreover, one end of the bilateral trigger diode D6 connects with the anode end of the third diode D5 and the other end of the bilateral trigger diode D6 connects with a connecting point of the second regulation diode set D4 and the second resistor R2.

Figure 4:
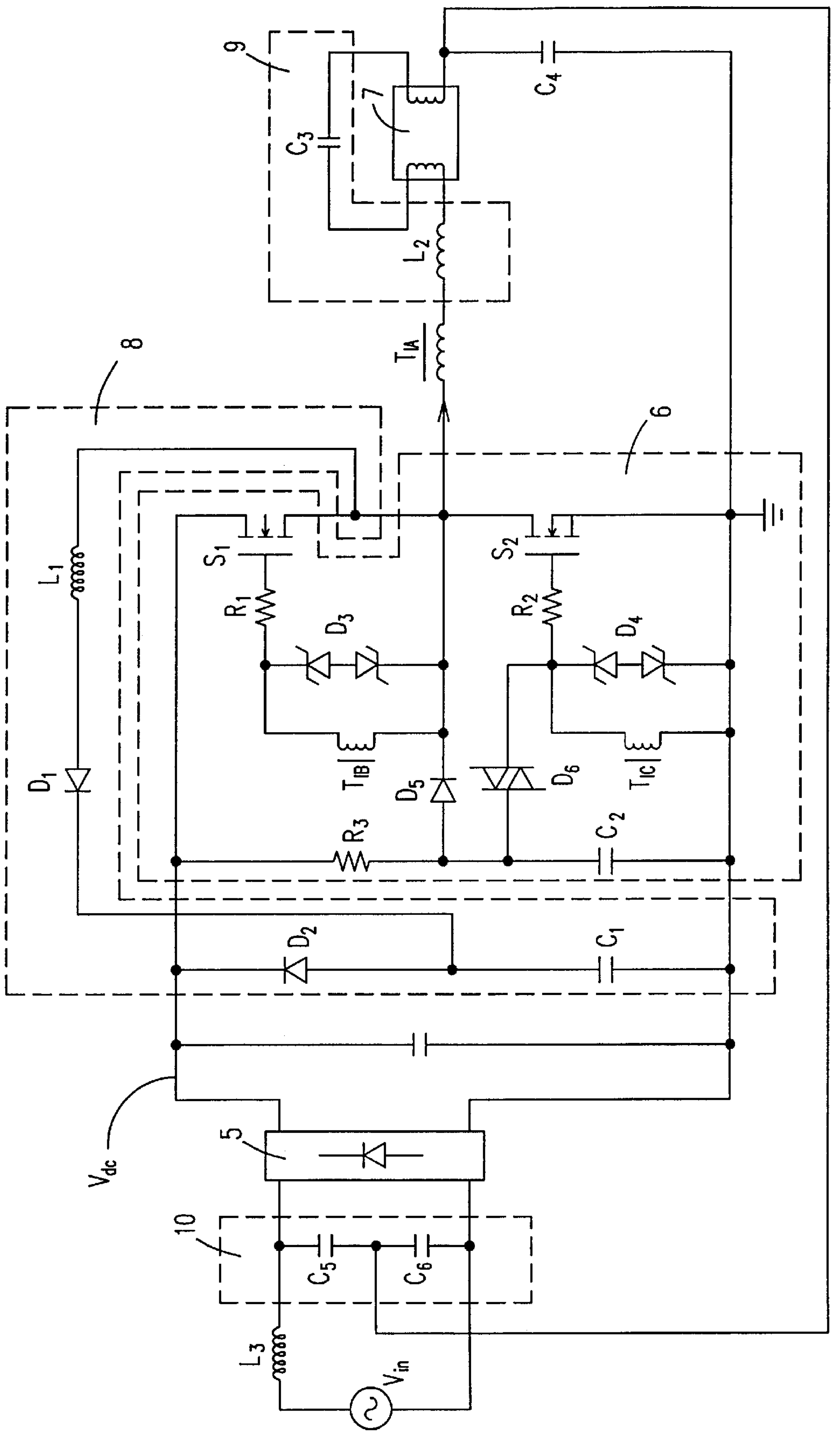
FIG. 4 illustrates a second preferred embodiment of a ballast converter with a power factor and current crest factor correction.
Figure 5A:
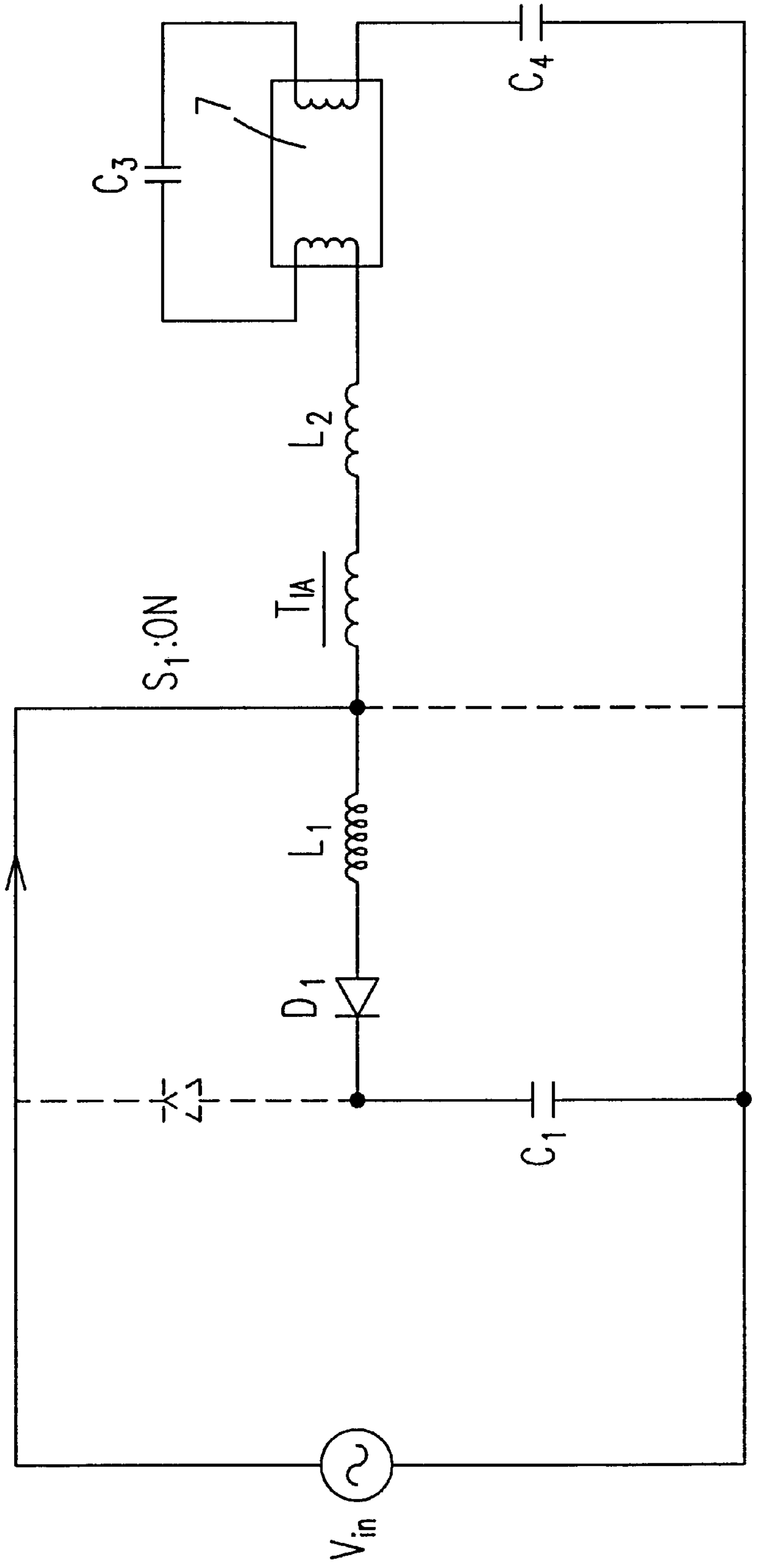
FIGS. 5(*a*)–5(*d*) illustrate a working principle of a preferred embodiment of a ballast converter with a power factor and current crest factor correction.
Figure 5B:
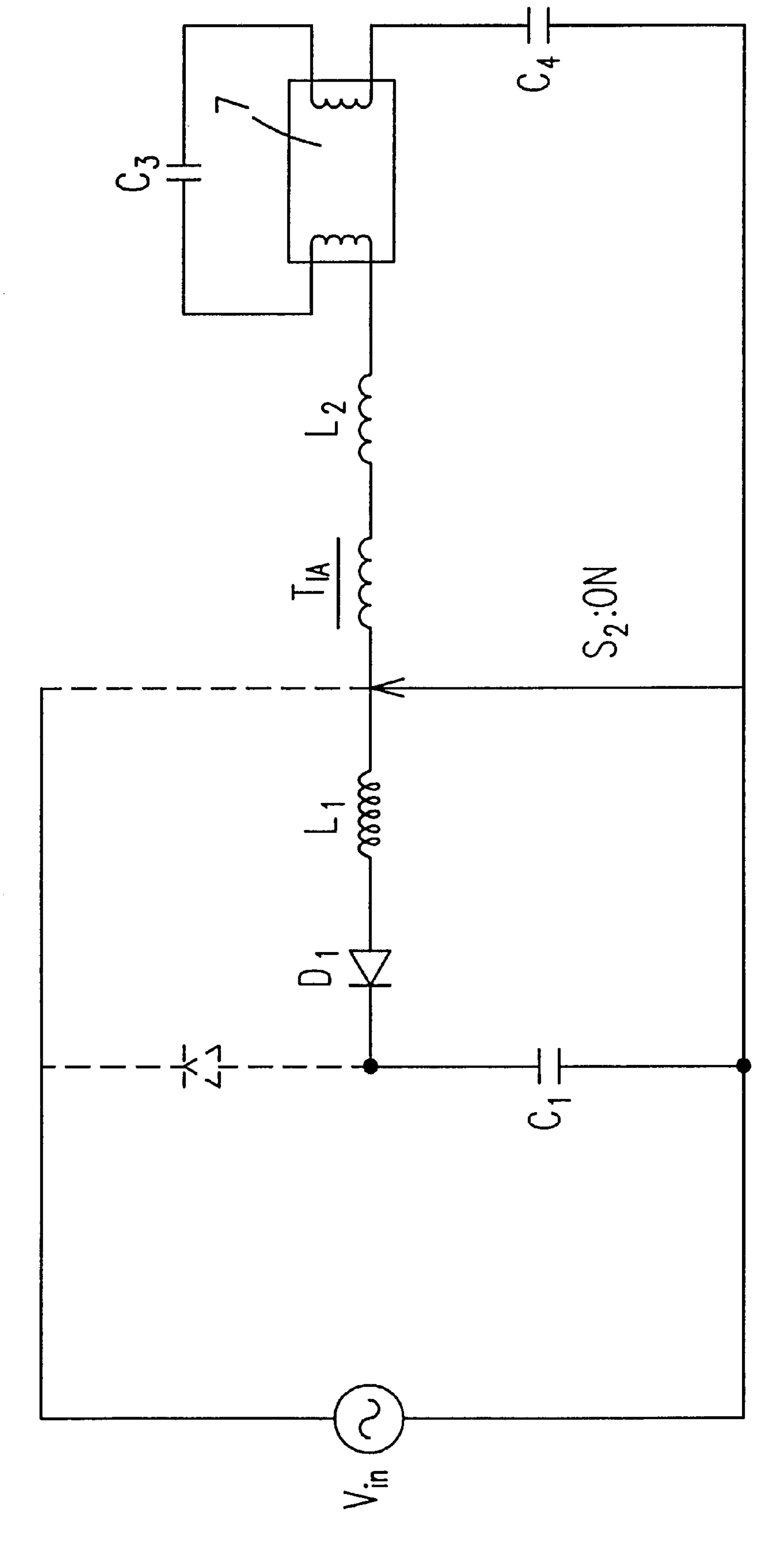
Figure 5C:
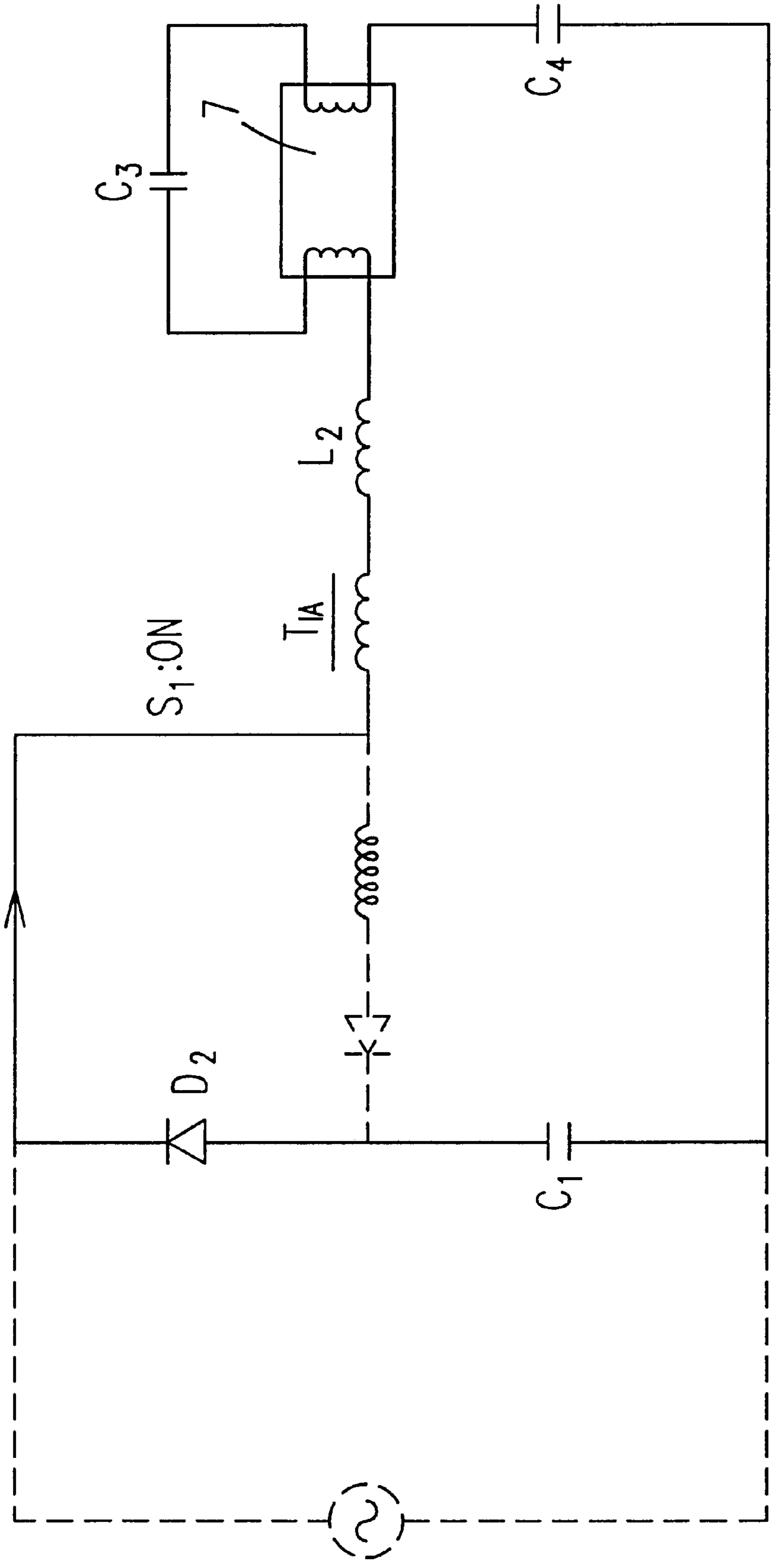
Figure 5D:
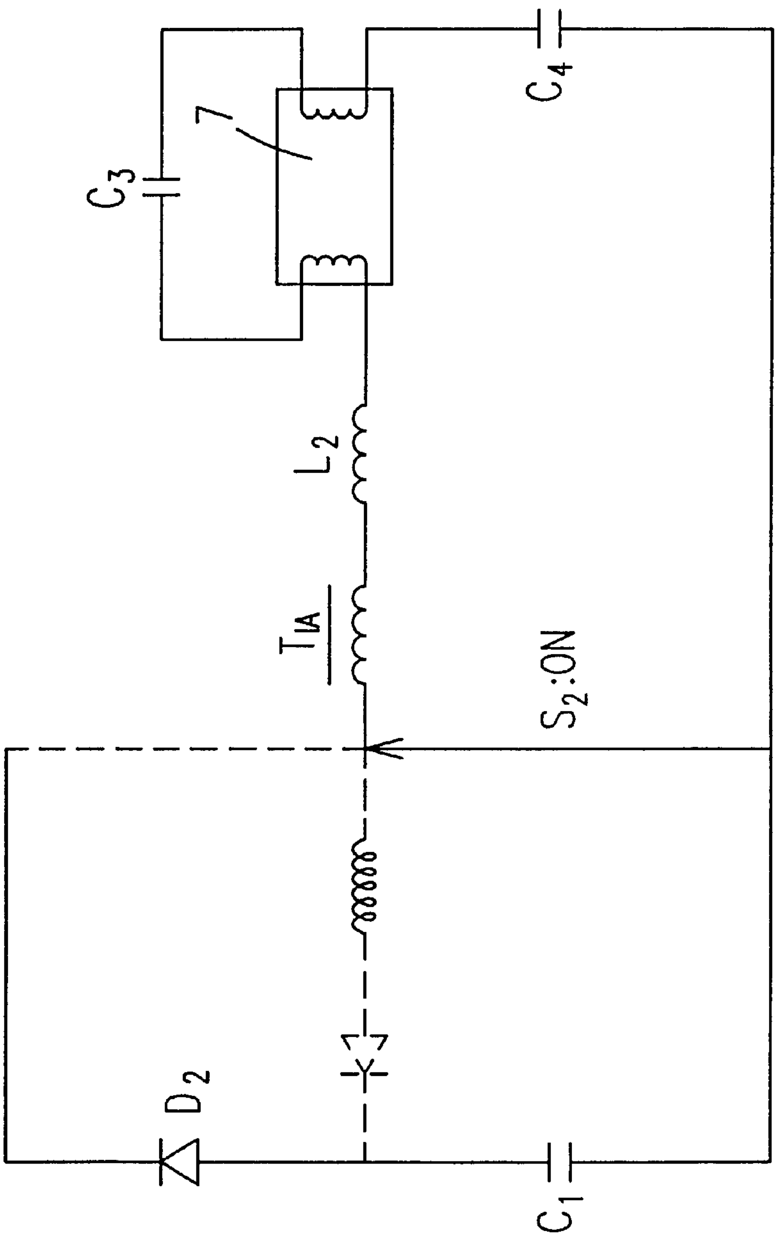

Referring to FIG. 4, it illustrates a second preferred embodiment of a ballast converter with a power factor and current crest factor correction, wherein the rectifier 5, the power convert 6, the valley fill circuit 8 and the load 7 are the same as those shown in FIG. 3, and the load 7 is a discharge lamp. The second preferred embodiment of the ballast converter further includes a resonance circuit 9 connected with the load 7, wherein the resonance circuit 9 includes a second inductor L2 and a second capacitor C3 for providing a desired current to the load 7. The second capacitor C3 and the load 7 are electrically connected in series, and the second inductor L2 and the load 7 are connected in parallel, wherein the other end of the second inductor L2 electrically connects with the other end of the primary winding T1A.

Moreover, the ballast converter further includes a wave-filter inductor L3 electrically connecting with the input voltage Vin, wherein the other end of the wave-filter inductor L3 is electrically connected with the rectifier 5 for filtering the wave from the input voltage Vin.

Furthermore, the ballast converter further includes a set of a charge pump capacitor 10 electrically connected with the high frequency end of the load 7 and two ends of the input source for providing a high frequency current circuit between the load 7 and the input voltage Vin, wherein the charge pump capacitor 10 modifies the input voltage Vin to improve the power factor of the ballast converter. Additionally, the ballast converter further comprises a second energy-storing capacitor C4 connected with the high frequency end of the load 7 for recharging the second energy-storing capacitor C4. The charge pump capacitor 10 includes a first charge pump capacitor C5 and a second charge pump capacitor C6, wherein the first charge pump capacitor C5 and the second charge pump capacitor C6 are connected in series and the connecting point of the first pump capacitor C5 and the second pump capacitor C6 connects with the high frequency end of the load 7 for providing a high frequency current circuit between the load 7 and the input voltage Vin.

Referring to FIGS. 5(*a*)–5(*d*), it illustrate a working principle of a preferred embodiment of a ballast converter with a power factor and current crest factor correction. As shown in FIG. 5(*a*), when the value of the input voltage Vin is larger than the value of the voltage Vc1 of the first energy-storing capacitor C1, the first transistor is on, the second transistor is off, and the input voltage Vin recharges the first energy-storing capacitor C1 through the first inductor L1 and the first diode D1 and provides energy to the load 7 to recharge the second capacitor C4. As shown in FIG. 5(*b*), when the value of the input voltage Vin is larger than the value of the voltage Vc1 of the first store capacitor C1, the first transistor is off, the second transistor is on, and the first inductor L1 continuously recharges the first energy-storing capacitor C1. Additionally, the load 7 becomes a conductive current circuit and makes the second energy-storing capacitor C4 discharge. As shown in FIG. 5(*c*), when the value of the input voltage Vin is lower than the value of the voltage Vc1 of the first energy-storing capacitor C1, the first transistor is on, the second transistor is off, and the voltage Vc1 provides energy to load 7 and recharges the second energy-storing capacitor C4 through the second diode D2 and the first transistor S1. As shown in FIG. 5(*d*), when the value of the input voltage Vin is lower than the value of the voltage Vc4 of the second energy-storing capacitor C4, the load 7 becomes a conductive current circuit and makes the second energy-storing capacitor C4 discharge. Accordingly, the voltage Vc1 of the first energy-storing capacitor C1 can be adjusted in response to the adjustment of the inductance of the first inductor L1 to improve the current crest factor.

Accordingly, the present invention provides a ballast converter with a power factor and a current crest factor correction, which has a lot of advantages including: (1) the value of the current crest factor can be made lower than 1.7 through suitably designing the valley fill circuit; (2) obtaining the better power factor according to the design of the preferable valley fill circuit and the charge pump capacitor circuit; (3) limiting the DC voltage below 450 volts during the transient state at the 220 Vac input voltage. Hence, it is obvious that the present invention will be desirously applied in the industry.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. A ballast converter with a power factor and crest factor correction electrically connected to a power source for providing an input voltage comprising:

a rectifier electrically connected to said power source for rectifying said input voltage so as to provide a first voltage at a pair of DC supply terminal;

a power converter electrically connected to said rectifier for converting said first voltage into a high frequency output voltage so as to provide a load with an electrical energy; and a valley fill circuit electrically connected with an output end of said power converter and said DC supply terminals, wherein said power converter charges said valley fill circuit for storing energy while the value of said first voltage is larger than a predetermined value, said valley fill circuit provides said first voltage with a supplementary energy while the value of said first voltage is lower than said predetermined value, and said predetermined value is adjustable by said valley fill converter circuit, wherein said valley fill circuit comprises:

a first inductor having one end electrically connected with said output end of said power converter;

a first diode having a anode end electrically connected with the other end of said first inductor;

a first energy-storing capacitor having one end electrically connected with a cathode end of said first diode and the other end electrically connected with the ground; and a second diode having a anode end electrically connected with said cathode end of said first diode and cathode end electrically connected with one of said DC supply terminals.

2. The ballast converter according to claim 1, wherein said power converter is an inverter.

3. The ballast converter according to claim 1, wherein said first voltage is a DC voltage.

4. The ballast converter according to claim 1, wherein said load is a discharge lamp.

5. The ballast converter according to claim 1 further comprising a wave-filter inductor, said wave-filter inductor having one end electrically connected with said input voltage and the other end electrically connected with said rectifier for filtering said input voltage.

6. The ballast converter according to claim 1, further comprising a resonance circuit electrically connected with said load, wherein said resonance circuit comprises at least one inductor and at least one capacitor for providing a desired current to said load.

7. The ballast converter according to claim 6, wherein said resonance circuit further comprises:

a second capacitor electrically connected in series with said load; and a second inductor having one end electrically connected in parallel with said load and the other end electrically connected with the other end of a primary winding.

8. A ballast converter with a power factor and crest factor correction electrically connected to a power source for providing an input voltage comprising:

a rectifier electrically connected to said power source for rectifying said input voltage so as to provide a first voltage at a pair of DC supply terminal;

a power converter electrically connected to said rectifier for converting said first voltage into a high frequency output voltage so as to provide a load with an electrical energy;

a valley fill circuit electrically connected with an output end of said power converter and said DC supply terminals, wherein said power converter charges said valley fill circuit for storing energy while the value of said first voltage is larger than a predetermined value, said valley fill circuit provides said first voltage with a supplementary energy while the value of said first voltage is lower than said predetermined value, and said predetermined value is adjustable by said valley fill converter circuit; and a set of charge pump capacitors, said charge pump capacitors electrically connected with a high-frequency end of said load and two ends of said power source for providing a high-frequency current circuit between said load and said input voltage, thereby modifying the valley-current waves of said input voltage to improve said power factor of said ballast converter.

9. The ballast converter according to claim 8, wherein said load is a discharge lamp.

10. The ballast converter according to claim 8, further comprising a wave-filter inductor, said wave-filter inductor having one end electrically connected with said input voltage and the other end electrically connected with said rectifier for filtering said input voltage.

11. The ballast converter according to claim 8, further comprising a second energy-storing capacitor electrically connected with said high-frequency end of said load for charging said energy-storing capacitor.

12. The ballast converter according to claim 11, wherein said charge pump capacitor comprises a first charge pump capacitor and a second charge pump capacitor, wherein said first charge pump capacitor is electrically connected in series with said second charge pump capacitor, and a connecting point of said set of charge pump capacitors is electrically connected with said high-frequency end of said load for providing a high-frequency current circuit between said load and said input voltage.

13.The ballast converter according to claim 8, further comprising a resonance circuit electrically connected with said load, wherein said resonance circuit comprises at least one inductor and at least one capacitor for providing a desired current to said load.

14. The ballast converter according to claim 13, wherein said resonance circuit further comprises:

a second capacitor electrically connected in series with said load; and a second inductor having one end electrically connected in parallel with said load and the other end electrically connected with the other end of a primary winding.

15. A ballast converter with a power factor and crest factor correction electrically connected to a power source for providing an input voltage comprising:

a rectifier electrically connected to said power source for rectifying said input voltage so as to provide a first voltage at a pair of DC supply terminal;

a power converter electrically connected to said rectifier for converting said first voltage into a high frequency output voltage so as to provide a load with an electrical energy;

a valley fill circuit electrically connected with an output end of said power converter and said DC supply terminals, wherein said power converter charges said valley fill circuit for storing energy while the value of said first voltage is larger than a predetermined value, said valley fill circuit provides said first voltage with a supplementary energy while the value of said first voltage is lower than said predetermined value, and said predetermined value is adjustable by said valley fill converter circuit; and a set of charge pump capacitors, said charge pump capacitors electrically connected with a high-frequency end of said load and two ends of said power source for providing a high-frequency current circuit between said load and said input voltage, thereby modifying the valley-current waves of said input voltage to improve said power factor of said ballast converter.

16. The ballast converter according to claim 15, wherein said load is a discharge lamp.

17. The ballast converter according to claim 15, further comprising a wave-filter inductor, said wave-filter inductor having one end electrically connected with said input voltage and the other end electrically connected with said rectifier for filtering said input voltage.

18. The ballast converter according to claim 15, further comprising a resonance circuit electrically connected with said load, wherein said resonance circuit comprises at least one inductor and at least one capacitor for providing a desired current to said load.

19. The ballast converter according to claim 18, wherein said resonance circuit further comprises:

a second capacitor electrically connected in series with said load; and a second inductor having one end electrically connected in parallel with said load and the other end electrically connected with the other end of a primary winding.

* * * * *